United States Patent
Hellsing et al.

(10) Patent No.: US 11,035,276 B2
(45) Date of Patent: Jun. 15, 2021

(54) EXHAUST ADDITIVE DISTRIBUTION ARRANGEMENT AND SYSTEM

(71) Applicant: Scania CV AB, Södertälje (SE)

(72) Inventors: Robin Hellsing, Eskilstuna (SE);
Rickard Gunsjö, Stockholm (SE);
Niklas Nordin, Stockholm (SE);
Henrik Birgersson, Stockholm (SE)

(73) Assignee: SCANIA CV AB

( * ) Notice: Subject to any disclaimer, the term of this patent is extended or adjusted under 35 U.S.C. 154(b) by 0 days.

(21) Appl. No.: 16/619,498

(22) PCT Filed: Jun. 13, 2018

(86) PCT No.: PCT/SE2018/050619
§ 371 (c)(1),
(2) Date: Dec. 5, 2019

(87) PCT Pub. No.: WO2018/231135
PCT Pub. Date: Dec. 20, 2018

(65) Prior Publication Data
US 2020/0200061 A1    Jun. 25, 2020

(30) Foreign Application Priority Data
Jun. 14, 2017    (SE) .................................... 1750748-4

(51) Int. Cl.
*F01N 3/20*    (2006.01)
*F01N 3/28*    (2006.01)
*F01N 13/18*    (2010.01)

(52) U.S. Cl.
CPC ......... *F01N 3/2066* (2013.01); *F01N 3/2892* (2013.01); *F01N 13/1805* (2013.01); *F01N 2610/02* (2013.01); *F01N 2610/1453* (2013.01)

(58) Field of Classification Search
CPC ............. F01N 13/1805; F01N 13/1816; F01N 2240/20; F01N 2240/40; F01N 2470/10;
(Continued)

(56) References Cited

U.S. PATENT DOCUMENTS 6,722,123 B2 *    4/2004    Liu ........................ B01F 5/0616
60/286
7,448,206 B2 *    11/2008    Meingast .............. F01N 3/2892
60/286
(Continued)

FOREIGN PATENT DOCUMENTS

DE    10 2010 025 611 A1    1/2011
DE    10 2010 035 311 A1    3/2012
(Continued)

OTHER PUBLICATIONS

Novelty Search Report dated Dec. 27, 2016.
(Continued)

*Primary Examiner* — Jesse S Bogue
(74) *Attorney, Agent, or Firm* — Ostrolenk Faber LLP

(57) ABSTRACT

An exhaust additive distribution arrangement for an exhaust system of an internal combustion engine (2) includes an exhaust duct element (14), an exhaust additive injection unit (20), and a primary vaporization element (16); wherein the primary vaporization element (16) is a tubular body arranged in the interior of the exhaust duct element (16), has a predefined space between an inner surface of the exhaust duct element (14) and an outer surface of the primary vaporization element (16), and protrudes from the exhaust duct element (14) at an outlet end; and wherein the exhaust additive injection unit (20) is arranged to inject exhaust additive liquid from a point at the inner surface of the exhaust duct element (14) towards an inner surface of the primary vaporization element (16). The exhaust additive injection unit (20) is of the liquid-only type, and the primary
(Continued)

vaporization element (16) has a length that is sufficiently short to allow injected exhaust additive liquid to run off of the outlet end of the primary vaporization element (16). The present invention also concerns an exhaust additive distribution system and a vehicle (1) comprising the exhaust additive distribution arrangement.

17 Claims, 7 Drawing Sheets

(58) Field of Classification Search
CPC ............. F01N 2470/24; F01N 2610/02; F01N 2610/102; F01N 2610/1453; F01N 3/021; F01N 3/2066; F01N 3/2892; Y02A 50/20; Y02T 10/12
See application file for complete search history.

(56) References Cited

U.S. PATENT DOCUMENTS

| | | | |
|---|---|---|---|
| 7,856,807 B2* | 12/2010 | Gibson | ................. F01N 13/141 60/286 |
| 7,877,983 B2* | 2/2011 | Kunkel | ..................... F01N 1/12 60/286 |
| 8,683,790 B2* | 4/2014 | Ranganathan | ...... B01F 3/04049 60/324 |
| 9,243,544 B2 | 1/2016 | Többen | |
| 9,453,444 B2 | 9/2016 | Fischer et al. | ................. 60/286 |
| 9,909,478 B2* | 3/2018 | Fejer-Simon | ......... B01F 5/0618 |
| 10,436,095 B2 | 10/2019 | Greber | |
| 2009/0084094 A1 | 4/2009 | Goss | |
| 2014/0033686 A1 | 2/2014 | Fischer et al. | ................. 60/286 |
| 2014/0102082 A1 | 4/2014 | Többen et al. | ................. 60/295 |

FOREIGN PATENT DOCUMENTS

| | | |
|---|---|---|
| DE | 10 2011 112 988 A1 | 4/2012 |
| EP | 2719873 A1 | 4/2014 |
| EP | 3 141 719 A1 | 3/2017 |
| FR | WO 2006126993 * | 4/2012 |
| FR | 2 971 546 A1 | 8/2012 |
| KR | 10-2017-0038176 A | 4/2017 |
| WO | WO 2005/103459 A1 | 11/2005 |
| WO | WO 2012/052690 A1 | 4/2012 |

OTHER PUBLICATIONS

Office Action dated Jan. 12, 2018 in corresponding Swedish Patent Application No. 1750748-4.
International Search Report dated Aug. 22, 2018 in corresponding PCT International Application No. PCT/SE2018/050619.
Written Opinion dated Aug. 22, 2018 in corresponding PCT International Application No. PCT/SE2018/050619.
European Search Report, dated Sep. 11, 2020, issued in corresponding European Patent Application No. 18817157.3. Total 7 pages.
Korean Office Action, dated Mar. 20, 2021 issued in corresponding Korean Patent Application No. 10-2019-7037322. English translation. Total 25 pages.

* cited by examiner

EXHAUST ADDITIVE DISTRIBUTION ARRANGEMENT AND SYSTEM

CROSS REFERENCE TO RELATED APPLICATIONS

The present application is a 35 U.S.C. §§ 371 national phase conversion of PCT/SE2018/050619, filed Jun. 13, 2018, the contents of which are incorporated herein by reference which claims priority of Swedish Patent Application No. 1750748-4, filed Jun. 14, 2017, the contents of which are incorporated by reference herein. The PCT International Application was published in the English language.

TECHNICAL FIELD

The present invention relates to exhaust additive distribution arrangements for the exhaust systems of internal combustion engines. The present invention further relates to exhaust additive distribution systems comprising such exhaust additive distribution arrangements, as well as to vehicles comprising such exhaust additive distribution arrangements or systems.

BACKGROUND ART

Emissions standards for motor vehicles are becoming increasingly stringent. Such standards typically specify maximum emission levels for a number of tailpipe pollutants including carbon monoxide (CO), hydrocarbons (HC), nitrogen oxides (NOx) and particulate matter (PM). In order to meet the requirements of the present and presumably future standards, vehicles are required to be equipped with emissions reduction technologies. Such emissions reduction technologies suitable for diesel vehicles include exhaust gas recirculation (EGR), particulate filters, diesel oxidation catalysts (DOC), and selective catalytic reduction (SCR). Each technology has its own distinct advantages and disadvantages, and may increase the incidence of one pollutant while reducing the incidence of another. For example, EGR may reduce NOx emissions, but reduce fuel efficiency and increase particulate matter. Therefore, a number of technologies are commonly applied together in order to meet emissions standards. Selective catalytic reduction (SCR) is an effective technology to reduce tailpipe nitrogen oxides (NOx) emissions. It involves adding a reductant, such as ammonia, to the vehicle exhaust stream. The reductant, with the aid of a catalyst, reduces NOx in the exhaust stream to nitrogen gas (N2) and water. In practical implementations in motor vehicles, an aqueous urea solution is used as a reductant and this urea solution is decomposed to ammonia and carbon dioxide in the hot exhaust stream.

Since SCR is implemented downstream of the engine as an exhaust aftertreatment, it does not affect the combustion performance of the engine in the same manner as for example EGR does. Therefore, it is desirable to be able to remove substantially all NOx from the exhaust stream using only SCR, without the need for EGR. However, this is not without difficulties. In order to produce the quantities of ammonia required to reduce substantially all NOx, large quantities of urea solution must be injected into the exhaust stream. If the exhaust stream is sufficiently hot, the urea solution will evaporate and decompose to ammonia. At sub-optimal temperatures, the urea solution may instead form deposits on surfaces of the exhaust conduit. Such deposits may include crystallised urea, as well as urea decomposition byproducts such as cyanuric acid. These deposits can be removed by heating the exhaust system at temperatures approaching or in excess of 400° C., but such temperatures are rarely achieved during normal operation of the vehicle and therefore, special procedures must be adopted to remove the exhaust deposits.

A further difficulty with SCR is the requirement for efficient mixing in order to achieve uniform distribution of reductant over the entire surface area of one or more SCR catalyst substrates. The space available for mixing is extremely limited and the reductant is commonly injected into the exhaust stream shortly upstream of the SCR catalyst substrates. In order to improve mixing a mixing device, often resembling a turbine blade, is arranged in the exhaust pipe. However, even when using a mixing device, it is difficult to achieve sufficiently uniform mixing. Moreover, the presence of a mixing device in the exhaust pipe acts as an obstruction to flow, causing higher pressure upstream of the mixer (backpressure) and reducing the engine efficiency.

These problems may in part be addressed by providing injection of the reductant further upstream in the exhaust system, for example in parts of the exhaust system mounted in fast relation to the vehicle's engine, such as immediately downstream of any turbocharger or exhaust brake in the exhaust gas conduit. Exhaust temperatures are typically higher in this region and there is less thermal lag when raising the system to operating temperature after a cold start.

However, locating the reductant injection in this region may cause further problems. In an exhaust system the upstream components closest to the engine, such as the exhaust manifold, turbocharger and exhaust brake, are typically mounted in fast relation to the engine. Components further downstream the exhaust system such as silencers and aftertreatment catalysts are typically mounted in fast relation to the vehicle chassis. In order to allow relative motion between the upstream components and the downstream components, as well as to prevent vibrations, a flexible decoupling element is often located in the exhaust system downstream of the upstream components and downstream of the upstream components. The decoupling element is often a bellows or strip wound hose. Unwanted deposition of urea in the decoupling element by an upstream injector located causes gradual stiffening of the decoupling element, causing increased vibrations in the exhaust system and premature component failure.

Attempts have been made to remedy deposition of urea in the decoupling element.

DE 102010025611 A1 discloses an exhaust gas line which can be used in particular in a passenger car. The exhaust gas line comprises at least one pipe which surrounds an inner pipe which can be circulated by exhaust gas and can be passed through in the axial direction by exhaust gas. An injector for introducing a reducing agent suitable for reducing nitrogen oxides to nitrogen into the inner tube opens into the inner tube obliquely to the axial direction of the inner tube. In an advantageous embodiment, the inner pipe is arranged in the region of a decoupling element, by means of which a first pipe is connected to a second pipe of the exhaust pipe. The inner tube shields the decoupling element from the reducing agent introduced into the discharge zone, so that a deposit of ingredients of the reducing agent cannot occur on the decoupling element. A mixer is arranged in the inner tube or downstream of the outlet of the inner tube.

There remains a need for an improved means of adding a reductant to an exhaust stream.

SUMMARY OF THE INVENTION

The inventors of the present invention have identified a number of shortcomings with regard to prior art solutions for providing a reductant to an exhaust stream. Some prior art solutions teach an inner tube extending along substantially the entire length of the decoupling element. This has a number of disadvantages. The long inner tube fixed at a point towards the inlet end has resonance at a frequency that may commonly occur within the engine or environs, causing vibration, noise and risk of premature component failure. Moreover, during a cold start when exhaust temperatures are still low, urea and by-products may be deposited towards the downstream end of the long inner tube. Such deposits may impair the heat transfer properties of the inner tube, making further deposits more likely and leading eventually to a component with suboptimal function.

Some prior art solutions teach the use of a mixer downstream of the injector. As previously noted, the presence of a mixing device in the exhaust pipe acts as an obstruction to flow, causing higher pressure upstream of the mixer (backpressure) and reducing the engine efficiency.

It is therefore an object of the present invention to provide an improved means of adding a reductant to an exhaust stream of an exhaust system upstream of a decoupling device. Another object of the present invention is to provide a means of adding reductant that is more robust and less prone to deposit build-up and/or mechanical failure than prior art solutions.

These objects are achieved by an exhaust additive distribution arrangement for an exhaust system of an internal combustion engine as disclosed herein.

The exhaust additive distribution arrangement comprises an exhaust duct element, an exhaust additive injection unit, and a primary vaporization element. The exhaust additive injection unit is arranged to inject exhaust additive liquid from a point at the inner surface of the exhaust duct element towards an inner surface of the primary vaporization element and is of the liquid-only type. The primary vaporization element is a tubular body arranged in the interior of the exhaust duct element, has a predefined space between an inner surface of the exhaust duct element and an outer surface of the primary vaporization element, and protrudes from the exhaust duct element at an outlet end. The primary vaporization element has a length that is sufficiently short to allow injected exhaust additive liquid to run off the outlet end of the primary vaporization element. This runoff may suitably be determined at a typical operating condition, as described herein.

By using a primary vaporization device that is so short that the exhaust additive may run off, a number of advantages are obtained. The short primary vaporization element is less prone to vibration and resonance in the operating environment, and is thus quieter and less prone to mechanical failure due to excessive vibration. Because the exhaust additive runs off the end of the primary vaporization element, deposits of urea and/or byproducts are less prone to be formed on the surface of the primary vaporization element and the properties of the element are therefore less likely to be impaired by deposit build-up over time. Moreover, due to the exhaust additive running off the primary vaporization device and being entrained in passing exhaust gases, the exhaust additive is entrained and/or vaporized in several stages. This allows for a robust and efficient means of distributing exhaust additive in the exhaust gas.

The exhaust additive may preferably be a reductant, such as an aqueous urea solution. Such exhaust additives are widely used in the art in combination with SCR catalysts.

The primary vaporization element may have a length L such that the primary vaporization element extends from 10 mm to 300 mm, such as from 50 mm to 200 mm, or from 100 mm to 150 mm, in a longitudinal direction beyond where the injection axis of the exhaust additive injection unit meets the inner surface of the primary vaporization element.

Preferably, the primary vaporization element may extend a distance L in the longitudinal direction beyond the point at which the injection axis meets the inner surface of the primary vaporization unit that is approximately equal to or to the diameter of the exhaust duct at the outlet end of the exhaust duct, such as from 50% to 150% of the diameter, or 80% to 120% of the diameter. This may ensure a suitable degree of runoff.

The outlet end of the primary vaporization element may have a smaller cross sectional area than an inlet end of the primary vaporization element. This provides an acceleration of exhaust gas within the primary vaporization element and assists in the mixing and vaporization of the exhaust additive. For example, the outlet cross section area may be less than 90% of the inlet cross section area, such as less than 80% of the inlet cross section area or less than 70% of the inlet cross section area. The acceleration of the exhaust gas through the primary vaporization element also assists in blowing clean the outlet end of the vaporization element, thus ensuring that additive droplets do not fasten on and evaporate at the outlet edge, which would otherwise lead to urea deposits forming at this outlet edge. Moreover, the use of a convergent primary vaporization element with a smaller outlet end than inlet end allows a greater movement of the vaporization element relative to a decoupling device, as compared to using a non-convergent, e.g. cylindrical vaporization element. This means that a vaporization element having a relatively large inlet cross sectional area may be used without risking undesired contact between the vaporization element and the decoupling element, as compared to embodiments utilizing a cylindrical vaporization element.

The tubular body of the primary vaporization element may consist of non-foraminous metal. Thus, the primary vaporization element may be conveniently manufactured from sheet metal or by casting.

The exhaust additive distribution arrangement need not comprise a mixing device. Efficient mixing in several stages is obtained by the use of the primary vaporization element according to the present invention. Therefore, a further mixing device is not required. Since mixing devices tend to raise the backpressure in the exhaust system and reduce fuel economy, it is beneficial to avoid having to use a mixing device.

The cross-section of the primary vaporization element in a plane perpendicular to the central lengthwise axis of the primary vaporization element may have cross-sectional dimensions that are not equal and wherein the dimension that is congruous with the injection axis of the injection unit is the larger of the cross-sectional dimensions. For example, the primary vaporization element may have partially flattened walls, such that a cross-section of the primary vaporization element in a plane perpendicular to the central lengthwise axis of the primary vaporization element has the form of a circle wherein the sections formed by two parallel but diametrically opposed chords have been removed. Having non-equal dimensions may provide a larger distance for the exhaust additive to travel before impinging upon the primary vaporization device, while at the same time limiting the total volume occupied by the primary vaporization device in the exhaust duct.

The primary vaporization element may be fixedly attached to the exhaust duct element only in proximity to the inlet end of the primary vaporization element. This allows for the easy assembly and disassembly of exhaust systems comprising the exhaust additive distribution arrangement. The primary vaporization element may be fixedly arranged in relation to the exhaust duct element by struts between the exhaust duct element and the primary vaporization element and/or directly fixed to the exhaust duct element at an upstream edge of the primary vaporization element.

The exhaust additive injection unit may be arranged such that an incidence angle θ formed between the injection axis of the exhaust additive injection unit and a central axis of the primary vaporization element is from 10° to 90°, such as from 20° to 40°.

According to a further aspect, the objects of the present invention are achieved by an exhaust additive distribution system disclosed herein. The exhaust additive distribution system comprises a decoupling element and an exhaust additive distribution arrangement as described herein. The decoupling element is arranged at an outlet end of the exhaust duct element such that the outlet end of the primary vaporization element extends into an internal volume of the decoupling element, and such that there remains a predefined space between an inner surface of the decoupling element and the outer surface of the primary vaporization element.

By using the exhaust additive distribution arrangement together with a decoupling element, deposition of exhaust additive on the walls of the decoupling element is avoided due to the primary vaporization element and flow of exhaust gases outside of the primary vaporization element directing the path of the exhaust additive away from the walls of the decoupling element.

The primary vaporization element may extend at most 60% along a length of the decoupling element in a longitudinal direction, such as at most 40%. The combination of a flexible decoupling element with a short primary vaporization element facilitates drawing the decoupling element over the primary vaporization element during assembly or drawing it off of the primary vaporization element during disassembly for service.

A secondary vaporization element may be arranged at an outlet end of the decoupling element. The secondary vaporization element assists in vaporizing large droplets carried in the exhaust gas stream, thus providing yet another vaporization stage and a greater system robustness. The secondary vaporization element may be an insulated duct element. For example, the secondary vaporization element may be an insulated duct element comprising a bend arranged to redirect the mean direction of the exhaust gas flow. The insulation assists in keeping the wall temperature in the secondary vaporization element high in order to assist evaporation, and the bend allows droplets entrained in the exhaust gas to impinge in the wall of the secondary vaporization element due to inertia.

The decoupling element may be a bellows element or a strip-wound hose element. Such decoupling elements are well-established and robust.

According to another aspect of the present invention, the objects of the invention are achieved by a vehicle comprising an exhaust additive distribution arrangement or an exhaust additive distribution system as disclosed herein.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
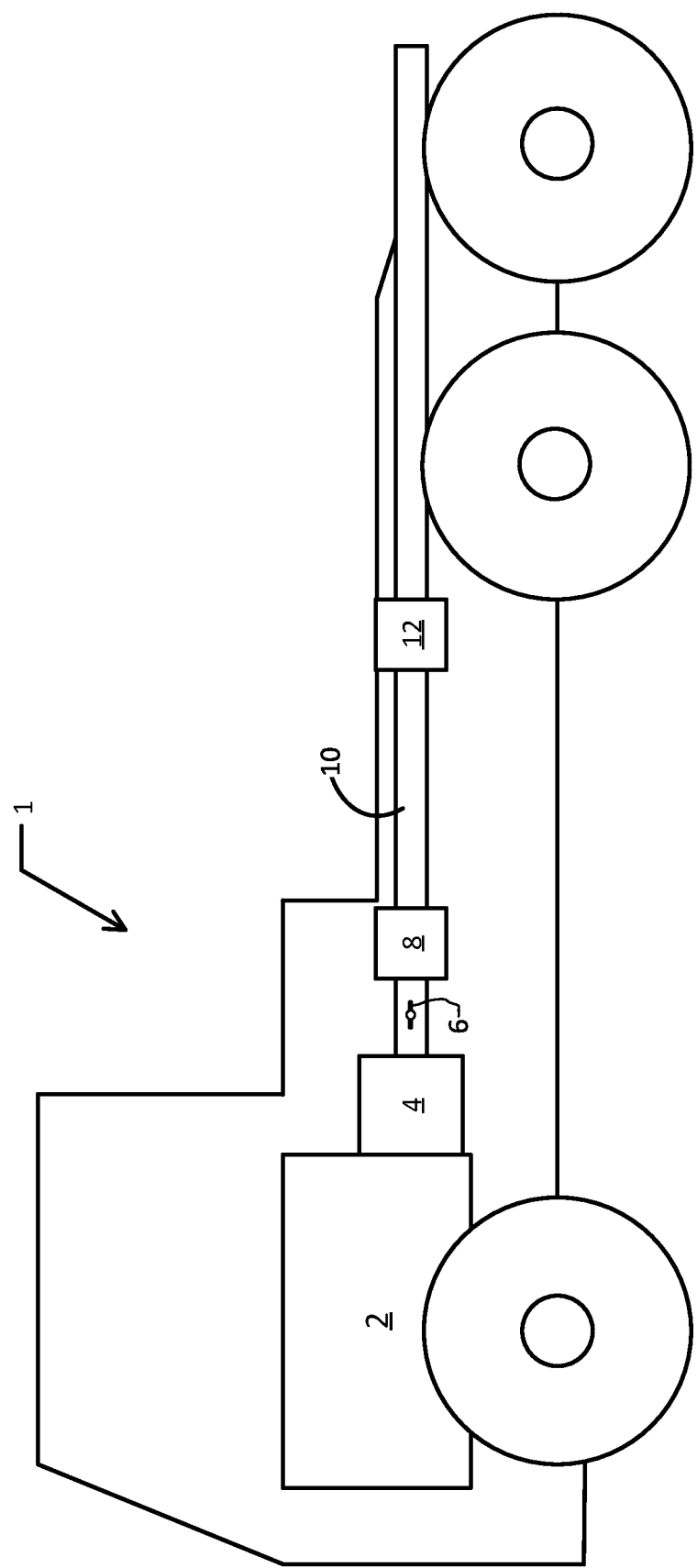
FIG. 1 schematically illustrates a vehicle comprising an exhaust additive distribution system according to an embodiment of the present invention.

The present invention concerns an exhaust additive distribution arrangement and an exhaust additive distribution system for an exhaust system of an internal combustion engine. The exhaust additive distribution system comprises an exhaust duct leading on to a decoupling device, both of which define the outer boundaries of an exhaust gas conduit. Within the inner volume formed by the exhaust duct and decoupling device, an inner tube is arranged such that a predetermined gap is formed between the outer wall of the inner tube and the inner surfaces of the decoupling device and exhaust duct. Exhaust gas flowing through the distribution system flows not only through the inner tube, but also through this gap between the outer wall of the inner tube and the inner surfaces of the decoupling device and exhaust duct. Thus, the inner tube is heated by exhaust flow both through the interior and at the exterior of the tube. The nozzle of an additive injection unit is located at the wall of the exhaust duct and is arranged to spray exhaust additive towards the interior surface of the inner tube. Exhaust additive sprayed on the heated walls of the inner tube may be evaporated and carried by the exhaust gas flow to a downstream aftertreatment catalyst.

Upstream and downstream respectively refer to positions in the exhaust system with reference to the typical direction of flow of exhaust gas from the engine to the tailpipe. A component is designated upstream of another if it is located in the exhaust system closer to the engine, whereas it is designated downstream if it is located in the exhaust system closer to the tailpipe.

The present invention is based upon a discovery by the inventors that the inner tube may be considerably shorter than the length of the decoupling device without this leading to deposition of additive on the decoupling device, regardless of whether or not the injected additive is completely evaporated on or within the inner tube. The inventors have discovered that if the inner tube is short enough such that additive runs off of the downstream end of the inner tube, and the runoff droplets are entrained by the exhaust gas flow passing outside of the inner tube and are carried by this gas flow past the decoupling device without depositing on the decoupling device. Thus, the inner tube acts as a primary vaporization element, vaporizing a substantial portion, but not necessarily all, of the injected exhaust additive. The portion of exhaust additive not evaporated in the primary vaporization device runs off the primary evaporation device and is entrained as droplets in the exhaust flow passing around the exterior of the primary vaporization device. Such droplets are then either gradually vaporized as they are carried downstream in the gas flow, or they may impinge on a secondary vaporization surface where they are vaporized.

An exhaust additive distribution arrangement and/or system constructed in this manner has a number of advantages. Because exhaust additive is vaporized in the exhaust flow both within and outside of the primary vaporization device, the additive is more evenly distributed in the entirety of the exhaust gases. In general, the exhaust additive arrangement system provides excellent mixing of additive with exhaust gas, meaning that no separate mixer component is required. Because no mixer component is required, there is little pressure drop across the exhaust additive distribution device, meaning that it does not cause excessive back pressure or negatively impact the fuel economy of the engine. Because excessively large drops of injected additive merely run off the primary vaporization device and are entrained, there is a lesser need for careful control of injection droplet diameter and velocity, meaning for example that an airless injector may be used, and simpler, more robust injector devices may be used. Because the primary vaporization device is short enough for additive runoff, there is a lesser tendency of deposits to form on the downstream end of the vaporization device. The short vaporization device also means that there is a lesser risk for harmful resonance occurring despite the primary vaporization device only being supported at the upstream end. A further benefit is the ease of assembly and disassembly when having a primary vaporization device that protrudes only a short distance into the decoupling device.

The exhaust additive distribution arrangement of the present disclosure is located in the exhaust system for an internal combustion engine. The internal combustion engine may be any internal combustion engine, but is preferably a four-stroke combustion engine, even more preferably a compression ignition four-stroke combustion engine. The engine may be used in any application commonly known for internal combustion engines. It may for example be merchandized as a free-standing engine, for use for example in power generation or industrial settings. However, application in a vehicle is preferred. By vehicle it is meant any machine utilizing an internal combustion engine to provide motive force, either directly or indirectly, as in the case of series hybrid vehicles. This includes, but is not limited to, motor vehicles such as cars, trucks and buses; railed vehicles such as trains and trams; watercraft such as ships and boats; and aircraft. The exhaust additive is preferably a reductant, even more preferably diesel exhaust fluid comprising a solution of urea in water, in accordance with standard AUS 32 of ISO 22241. However, the exhaust additive may also be another liquid additive added to the exhaust stream, such as hydrocarbon fuel to "burn off" a diesel particulate filter arranged downstream in the exhaust system. However, henceforth the exhaust additive may be referred to simply as "reductant".

The exhaust additive distribution arrangement may be arranged in the exhaust system immediately downstream of a turbocharger and/or exhaust brake if present. Such a location far upstream in the exhaust system means that the arrangement is subjected to relatively high exhaust temperatures and relatively little thermal lag. This assists vaporization of the reductant, especially during cold start or low-temperature operation. However, the exhaust additive distribution arrangement may be located anywhere in the exhaust system where injection of additive is required, such as immediately upstream of a silencer of SCR catalyst. The exhaust additive distribution arrangement may beneficially be used in conjunction with a decoupling device and optionally a secondary vaporization element to form an exhaust additive distribution system. In such a case, the exhaust additive distribution arrangement is useful in preventing deposits on the decoupling device, as described above. However, the exhaust additive distribution arrangement in itself provides a number of advantages, such as excellent and robust addition of an additive to an exhaust stream, and therefore may also be used without a decoupling device or separately from any decoupling device in the exhaust system.

The primary vaporization element is constructed of a material which has good heat transfer and can withstand the conditions prevailing in the exhaust duct. Such materials include metals, such as steel and aluminium. The primary vaporization element may be produced by any material and method known in the art. For example, it may be produced by forming sheet metal, or it may be cast. The walls of the primary vaporization element are preferably continuous; i.e. they do not comprise mesh or perforations, and are not foraminous in any other manner.

The primary vaporization element has a tubular form. The primary vaporization element may be a cylinder, the simplest example of which being a right circular cylinder. The cross-section of the primary vaporization element, defined as a plane perpendicular to the central longitudinal axis of the primary vaporization device, may be circular, oval, polyhedral, such as square, pentagonal, hexagonal, heptagonal or octagonal, or a hybrid between a circle/oval and a polygon. For example, the cross-section may have a form resembling a circle or ellipse wherein the segments formed by two parallel but diametrically opposed chords have been removed. The primary vaporization element may have a length y in one dimension of the cross-sectional plane that is greater than the length x in the perpendicular dimension in the cross-sectional plane. Such shapes include ovals, ellipses and circles/ellipses wherein the sections formed by two parallel but diametrically opposed chords have been removed. In the case where the x and y dimensions of the primary vaporization element differ, it is preferable that the primary vaporization element is arranged in relation to the injection unit such that the larger of the x and y dimensions is co-planar with the central longitudinal axis of the primary vaporization element and the injection axis of the additive injection unit. This helps maximize the length that the spray ejected from the injection unit may travel before impinging on the primary vaporization element and assists in ensuring an effective and even distribution of reductant in the exhaust gases.

The primary vaporization element may preferably be constructed to provide an acceleration of exhaust gases passing through the primary vaporization element. This may be achieved by providing the primary vaporization element with a constriction at the outlet end or, more preferably, by tapering the primary vaporization element from the inlet end to the outlet end, such that the outlet cross-sectional area $A_o$ is smaller than the inlet cross-sectional area $A_I$. The outlet cross sectional area $A_o$ may be less than 90% of the inlet cross sectional area $A_I$, such as less than 80% or less than 70%. The taper may be constant along the length of the element or may vary along the length of the element. For example the primary vaporization element may comprise three sections: an inlet section having a constant cross-sectional area $A_I$ along the entire length of the inlet section; an outlet section having a constant cross-sectional area $A_o$ along the entire length of the outlet section, wherein $A_o$ is less than $A_I$; and a taper section intermediate the inlet section and the outlet section, having a cross-sectional area that gradually tapers from $A_I$ in proximity to the inlet section to $A_o$ in proximity to the outlet section.

The primary vaporization element has a length that is sufficiently short to allow injected exhaust additive liquid to run off the outlet end of the primary vaporization element during typical operating conditions. For example, a proportion of injected exhaust additive liquid, such as at least 1 weight % of injected exhaust additive liquid or at least 5 weight % of injected exhaust additive liquid, may run off the primary vaporization device when operating at a typical operating condition, such as when operating at one of the operating conditions detailed below. The table below provides a range of typical operating conditions at which urea runoff from the primary vaporization device is expected.

| Exhaust gas mass flow kg/h | Exhaust gas temperature ° C. | Dosage of AdBlue g/min |
|---|---|---|
| 0-500 | 150-250 | >5 |
|  | 250-350 | >10 |
|  | >350 | >15 |
| 500-1000 | 150-250 | >10 |
|  | 250-350 | >15 |
|  | >350 | >20 |
| >1000 | 150-250 | >15 |
|  | 250-350 | >20 |
|  | >350 | >30 |

Note that under certain operating conditions, such as high exhaust temperature and low exhaust additive mass flow, the exhaust additive may be fully vaporized by the primary vaporization element and therefore may not necessarily run off of the outlet end.

The primary vaporization surface is designed to provide vaporization surface for the injected exhaust additive and therefore the primary vaporization device should be long enough such that at least part of the spray cone from the injection unit impinges on the inner surface of the primary vaporization device. This may be at least the proportion of the spray cone furthest upstream, such that primary vaporization element extends only a short distance L in a longitudinal direction, such as from 10 mm, beyond the point at which the injection axis of the exhaust additive injection unit meets the inner surface of the primary vaporization element. However, substantially the entire spray cone may be allowed to impinge upon the primary vaporization device, including the portion of the spray cone furthest downstream, such that the primary vaporization element extends a significant distance L in a longitudinal direction, such as up to 300 mm, beyond the point at which the injection axis of the exhaust additive injection unit meets the inner surface of the primary vaporization element. Determination of where the spray cone impinges upon the primary vaporization element may be made under the assumption of zero exhaust gas flow for simplicity, since at high exhaust flows the spray may impinge upon the surface of the primary vaporization element further downstream or may not impinge upon the surface at all. Preferably, the primary vaporization element may extend a distance L in the longitudinal direction beyond the point at which the injection axis meets the inner surface of the primary vaporization unit that is approximately equal to the diameter of the exhaust duct and/or decoupling element, such as from 50% to 150% of the diameter, or from 80 to 120% of the diameter. If the primary vaporization element is used in conjunction with a decoupling element, the primary vaporization device may preferably extend at most 60% within the decoupling device, such as at most 40% within the decoupling device. This allows for simpler assembly and disassembly of the exhaust system since the decoupling device is flexible and may be easily drawn over or drawn off of a short primary vaporization device.

The exhaust additive injection unit is of the airless type, otherwise known as a liquid-only injection unit. This means that the metering device does not utilize compressed air in order to facilitate injection of the reductant into the exhaust conduit. Since a compressor requires energy to run, this represents an energy saving compared to air-assisted systems. Moreover, some applications such as marine applications do not necessarily have a ready source of compressed air to hand, and thus the use extra, costly components such as compressors can be avoided. Any standard airless injector may be used, and such injectors are known in the art. Because the exhaust additive distribution arrangement vaporizes the exhaust additive in several stages using the primary vaporization element, the droplet size provided by the injection unit is not critical, and a comparatively diverse droplet size and/or comparatively large droplets may be used. For example, the spray droplets of the injection unit may have a mean droplet diameter of from 20 µm to 150 µm, determined as the Sauter mean diameter. The injection unit is mounted on the wall of the exhaust duct upstream of the primary vaporization element and the injection unit is angled to ensure that substantially all of the injected reductant enters the interior of the primary vaporization element during normal operation. The injection unit may be arranged at an angle to maximize the proportion of spray droplets being entrained directly in the exhaust gas flow through the primary vaporization element without impinging on the primary vaporization element inner walls; i.e. the incidence angle θ formed between the central longitudinal axis of the primary vaporization device and the injection axis of the injection unit may be small, such as from 10° to 40°. However, the injection unit may also be arranged to maximize the proportion of spray droplets impinging on the inner wall of the primary vaporization element; i.e. the incidence angle θ formed between the central longitudinal axis of the primary vaporization device and the injection axis of the injection unit may be comparatively large, such as from 40° to 90°. The spray cone angle of the injection unit may be any cone angle known in the art, such as from 10° to 90°.

The exhaust duct may be made of any material known in the art, such as steel or aluminium. The primary vaporization element is suspended at least partially within the exhaust duct by for example struts running between the exhaust duct and the primary vaporization element at a location proximal to the inlet end. The exhaust duct and primary vaporization device may also be fixed relative to each other by a shared wall section at the inlet end of the primary vaporization device, or wall sections that run contiguously and are fixed to each other by appropriate means such as welding. The exhaust additive injection unit is mounted to the wall of the exhaust duct upstream of the inlet end of the primary vaporization device. A bend or recessed section may be formed in the exhaust duct proximal to the inlet end of the primary vaporization device and the mounted injection unit, in order to arrange the injection unit at a suitable angle relative to the central longitudinal axis of the primary vaporization device, as described above. However, the exhaust duct need not incorporate such a bend or recess and may for example be essentially straight.

If the exhaust additive distribution arrangement as described above is used as part of an exhaust additive distribution system, the system also further comprises a decoupling element and optionally a secondary vaporization element. Any decoupling element known in the art may be used. Such decoupling elements typically comprise strip-wound hoses or bellows. The decoupling element may be airtight or, if it is formed from for example a strip-wound hose, gas may escape from the walls of the decoupling element when pressurized. The decoupling element is flexible to accommodate relative movement between the chassis and the engine of the vehicle.

The exhaust duct, decoupling element and primary vaporization element are dimensioned in order to provide a gap between the outer wall of the primary vaporization device and the decoupling element/exhaust duct. The gap should be suitable to allow a sufficient flow of exhaust gas around the outside of the primary vaporization device in order to heat the walls of the primary vaporization device and entrain any exhaust additive running off the outlet end of the primary vaporization device. The gap may be larger at the inlet end of the primary vaporization device than at the outlet end of the primary vaporization device, and is not necessarily equal around the entire circumference of the primary vaporization device. For example, the primary vaporization device at its inlet end may occupy from 30% to 90% of the cross-sectional area of the exhaust duct, such as from 50% to 80%. The primary vaporization device at its outlet end may occupy from 30% to 90% of the cross-sectional area of the exhaust duct, such as from 30% to 80%. This ensures an exhaust flow outside of the primary vaporization device that is sufficient to entrain runoff from the vaporization device.

A secondary vaporization element may be arranged downstream of the decoupling element. The secondary vaporization element provides a secondary surface for evaporation of exhaust additive. The secondary vaporization element may be a section of exhaust duct that is insulated in order to maintain maximal evaporation temperatures. The insulation may be any insulation known in the art, such as glass wool insulation. The secondary vaporization element may comprise a bend or turn in order to change the primary direction of flow of exhaust gases. Large additive droplets entrained in the gas flow will tend to impinge on the inner wall of the bent secondary vaporization element due to their higher inertia than the surrounding gas particles. The exhaust additive may then evaporate from the hot surface of the secondary vaporization element. The secondary vaporization element is preferably not a mixing device, as mixing devices such as known in the art have a tendency to increase exhaust system backpressure. The present invention will now be further illustrated with reference to the appended figures.

DESCRIPTION OF EMBODIMENTS

FIG. 1 shows schematically a side view of a vehicle 1 according to an embodiment of the invention. The vehicle 1 includes a combustion engine 2, a turbocharger 4 and an exhaust brake 6. Immediately downstream of the exhaust brake 6, an exhaust additive distribution system 8 is arranged. An exhaust conduit 10 leads exhaust gases from the exhaust additive distribution system 8 to an SCR catalyst 12. The vehicle 1 may be a heavy vehicle, e.g. a truck or a bus. The vehicle 1 may alternatively be a passenger car. The vehicle may be a hybrid vehicle comprising an electric machine (not shown) in addition to the combustion engine 2.

Figure 2:
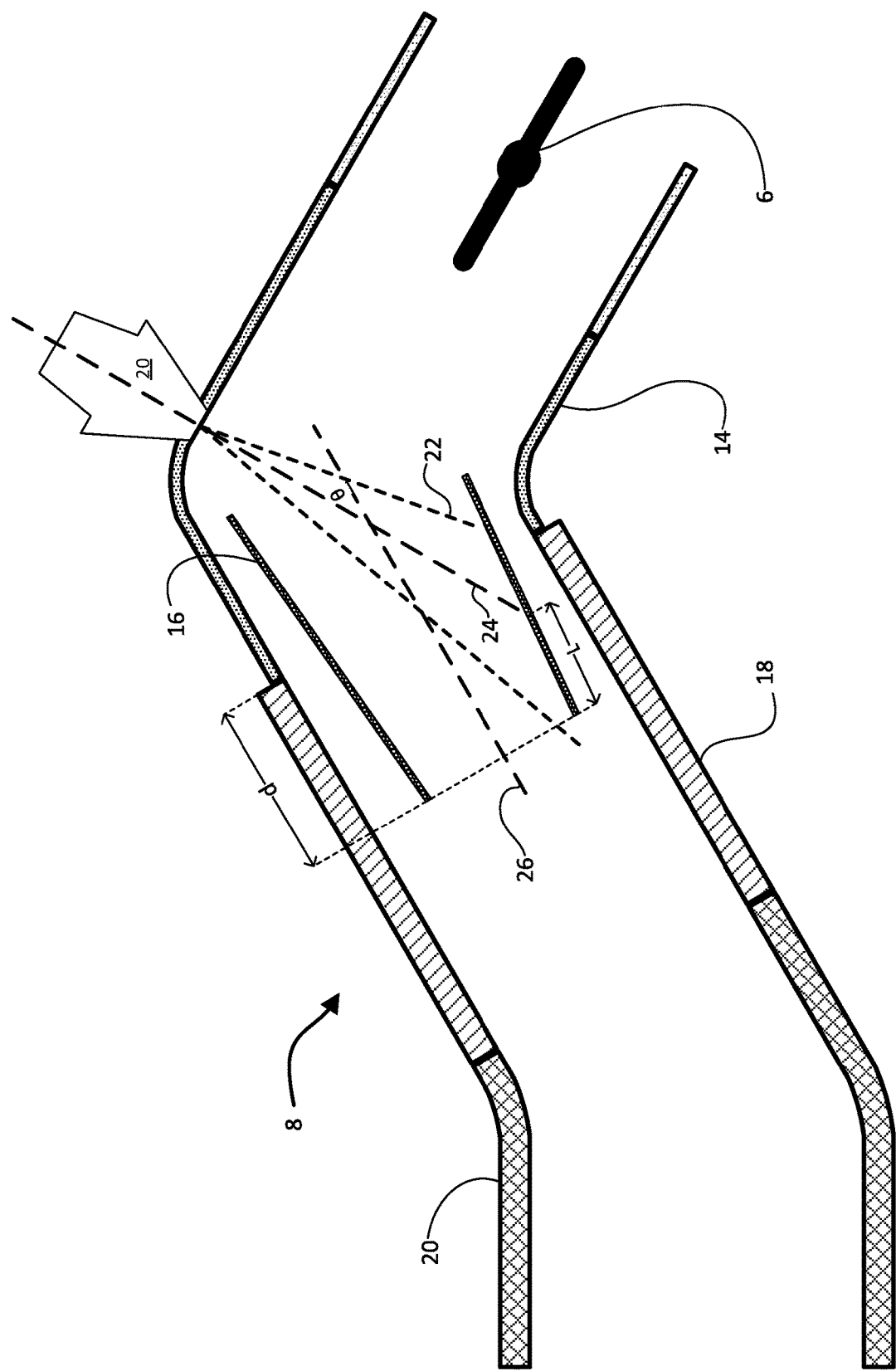
FIG. 2 schematically illustrates an exhaust additive distribution system according to an embodiment of the present invention wherein the primary vaporization element is continuously convergent.

FIG. 2 shows schematically an exhaust additive distribution system 8 according to an embodiment of the invention. The exhaust additive distribution system 8 is arranged immediately downstream of an exhaust brake 6. The exhaust additive distribution system comprises an exhaust duct 14, within which a primary vaporization element 16 is arranged. The primary vaporization element 16 is continuously convergent along its entire length. The primary vaporization element 16 protrudes from the outlet end of the exhaust duct 14 and extends into the interior volume of a decoupling element 18 by a distance d. Immediately downstream of the decoupling element 18, a secondary vaporization element 20 is arranged. Here the secondary vaporization element is in the form of an insulated pipe. An exhaust additive injection unit 20 is arranged at the upper wall of the exhaust duct 14. The injection unit 20 is arranged to spray exhaust additive onto the inner surface of the primary vaporization element 16. The spray cone 22 of the injection unit is depicted, together with the injection axis 24 of the injection unit and the central longitudinal axis 26 of the primary vaporization element 16. The angle θ formed between the injection axis 24 of the injection unit and the central longitudinal axis 26 of the primary vaporization element is shown. The primary vaporization element 16 extends a length L in the longitudinal direction beyond the point at which the injection axis 24 meets the wall of the primary vaporization element 16.

Figure 3:
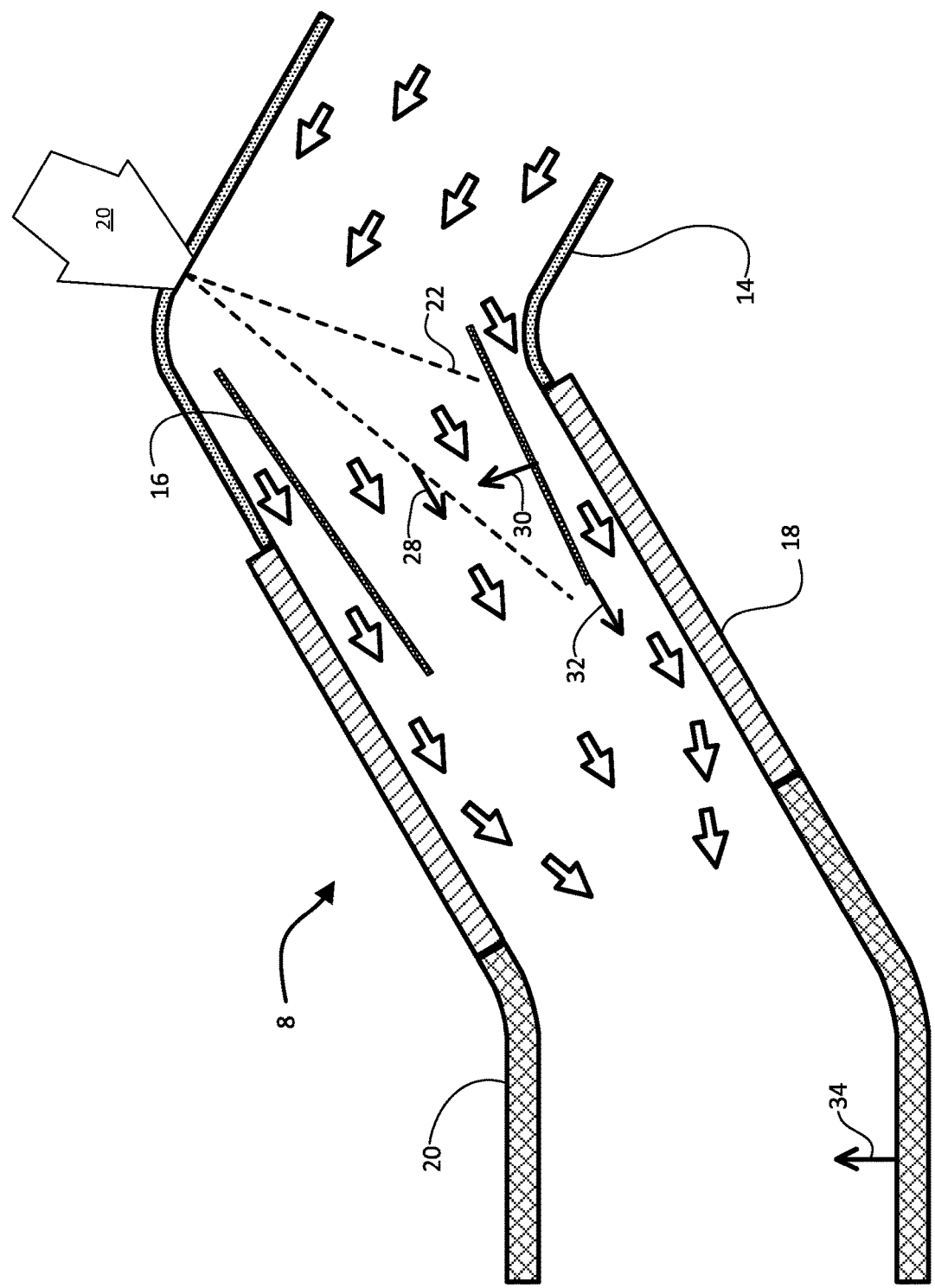
FIG. 3 schematically illustrates exhaust gas flow in an exhaust additive distribution system according to an embodiment of the present invention.

FIG. 3 schematically depicts the various stages of entrainment and/or vaporization of the exhaust additive. Open arrows depict the flow of exhaust gas, whereas filled arrows depict an entrainment or vaporization process. The injection unit provides a spray of exhaust additive, depicted here as a spray cone 22, towards the interior surface of the primary vaporization element 16. Hot exhaust gas passing through the interior of the primary vaporization element 16 entrains and vaporizes a proportion of the exhaust additive before it impinges on the primary vaporization device 16. This is depicted by arrow 28. The exhaust additive not directly entrained or vaporized by the exhaust gas impinges on the inner surface of the primary vaporization element 16. The walls of the primary vaporization element are heated by exhaust gas passing through the gap between the primary vaporization device 16 and the exhaust duct 14. Thus, a proportion of the exhaust additive on the wall of the primary vaporization element is evaporated, as depicted by arrow 30. The remaining exhaust additive runs along the surface of the primary vaporization element 16 until it reaches the outlet end, where it runs off and is entrained by the exhaust gas flowing through the gap between the primary vaporization device 16 and the exhaust duct 14 (as depicted by arrow 32). The entrained exhaust additive is carried past the decoupling element 18 without contacting the walls of the decoupling element, meaning that little or no exhaust additive is deposited on the wall of the decoupling element 18. Finally, exhaust additive droplets not fully vaporized by the point at which the exhaust flow reaches the secondary vaporization element 20 may impinge on the inner surface of the secondary vaporization element 20, where they may be evaporated by the passing hot exhaust gases, as depicted by arrow 34. Thus, the exhaust additive may be vaporized in a number of stages. This results in an exhaust additive distribution system that is robust, does not cause an excessive pressure drop, and can operate effectively over a wide range of operating parameters.

Figure 4:
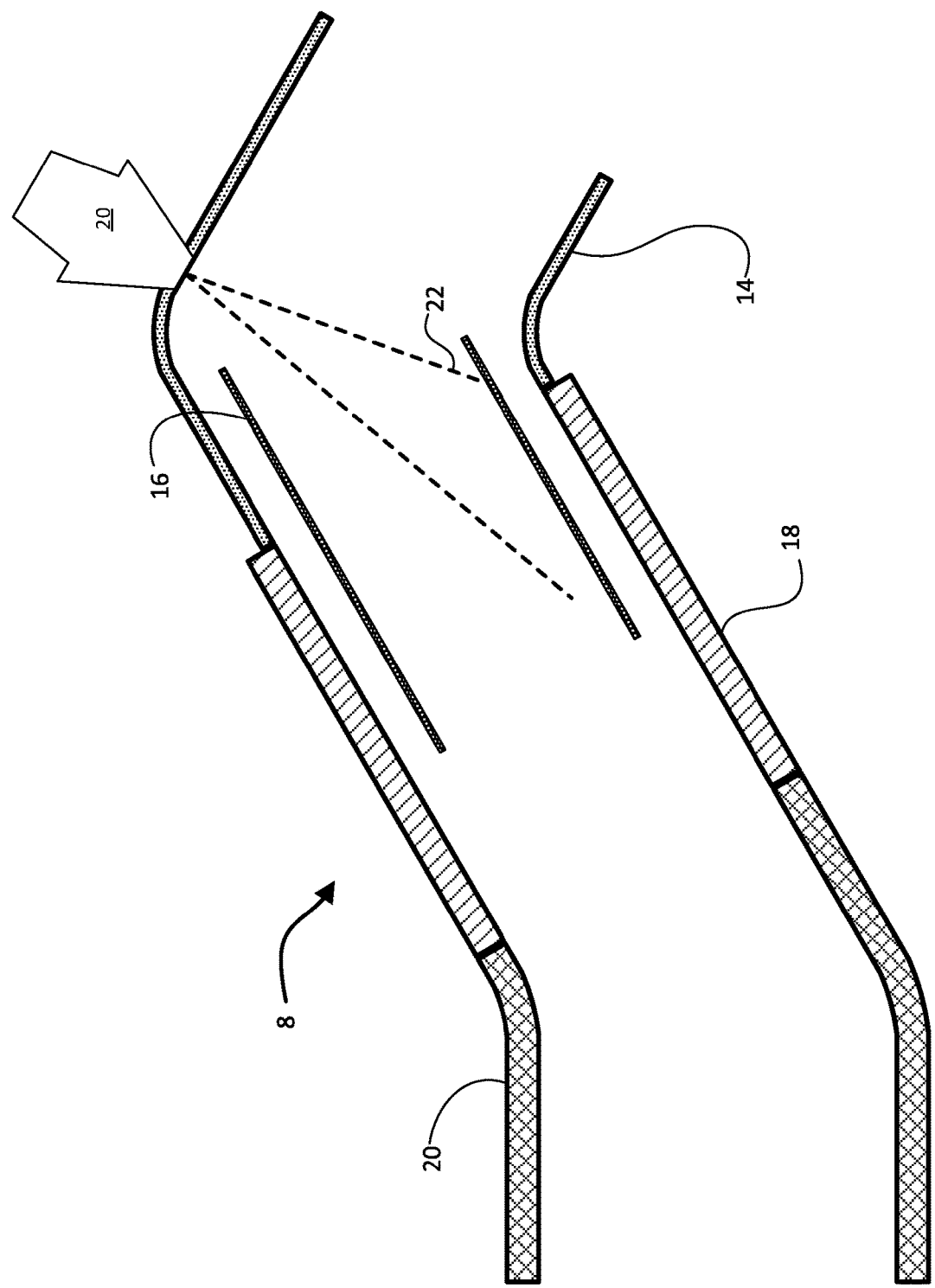
FIG. 4 schematically illustrates an exhaust additive distribution system according to an embodiment of the present invention wherein the primary vaporization element is non-convergent.

FIG. 4 schematically depicts an embodiment of the exhaust additive distribution system 8 wherein the primary vaporization element 16 is non-convergent, i.e. the cross-sectional area of the primary vaporization element is constant along the entire length of the vaporization element.

Figure 5:
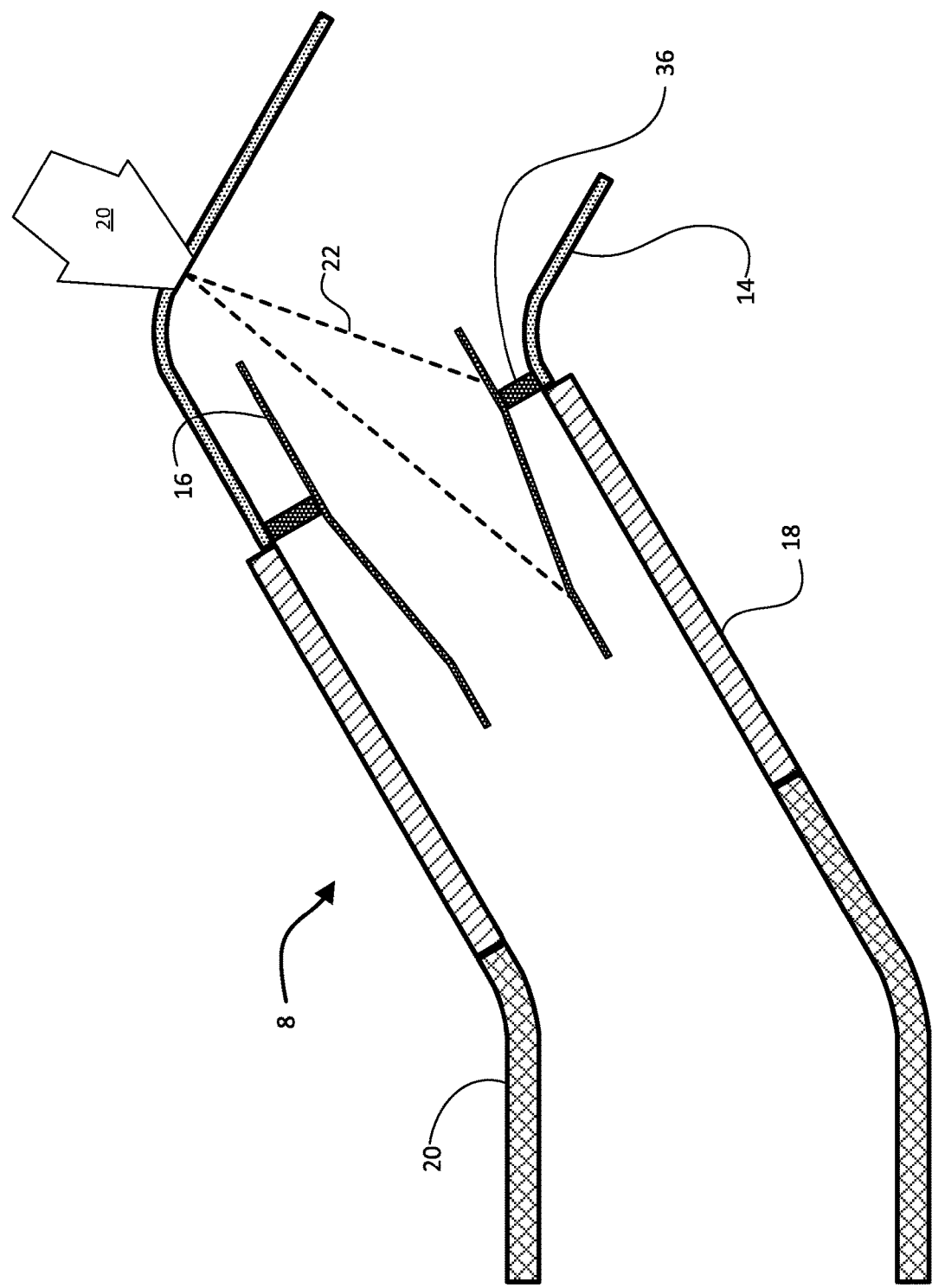
FIG. 5 schematically illustrates an exhaust additive distribution system according to an embodiment of the present invention wherein the primary vaporization element has non-convergent inlet and outlet sections, and a convergent middle section.

FIG. 5 schematically depicts an embodiment of the exhaust additive distribution system 8 wherein the primary vaporization element 16 has non-convergent inlet and outlet sections, and a convergent middle section. The primary vaporization element 16 is fixed in place by struts 36 running from the exhaust duct 14 to a position in proximity to the inlet end of the primary vaporization device 16.

Figure 6:
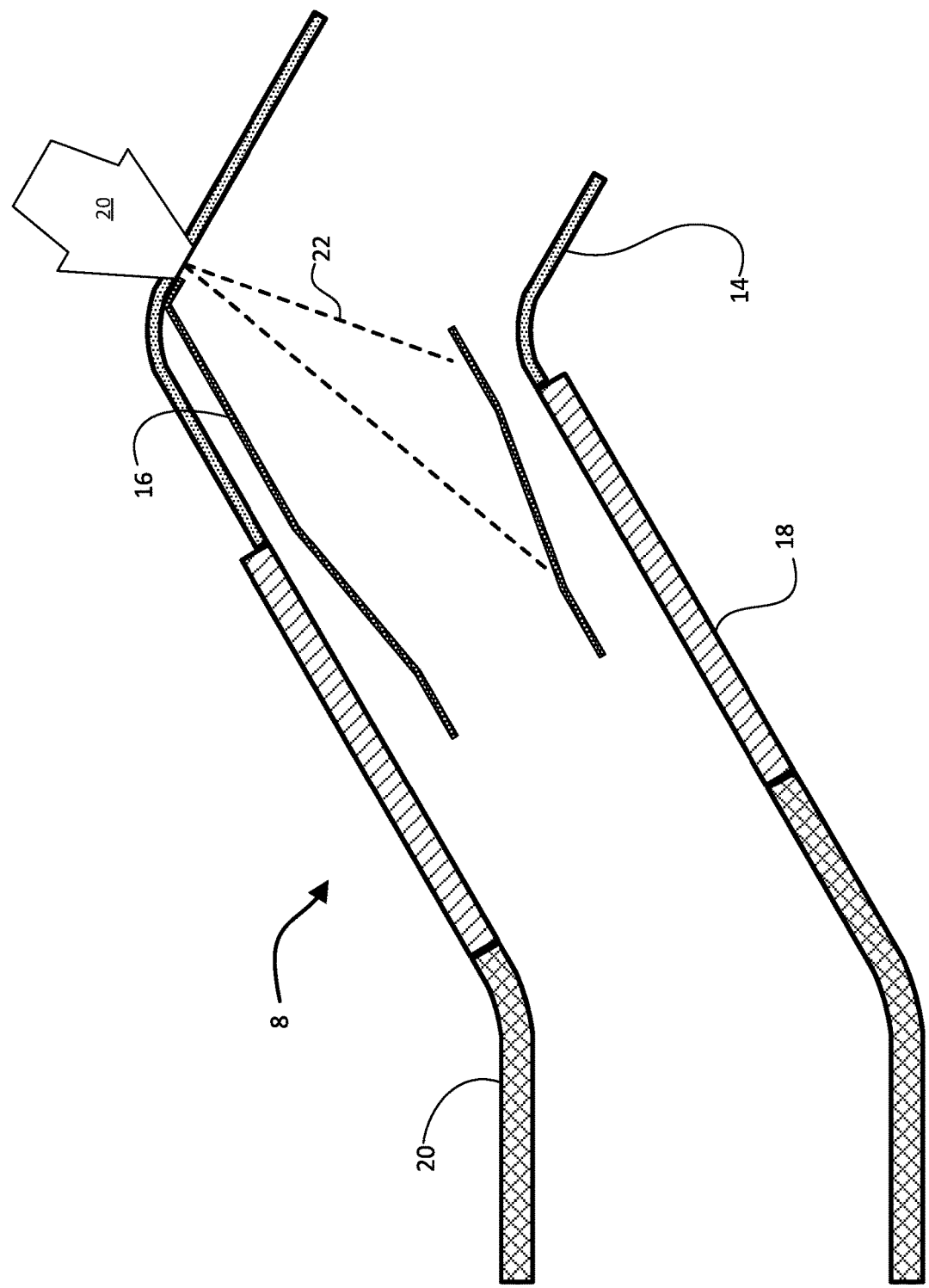
FIG. 6 schematically illustrates an exhaust additive distribution system according to a further embodiment of the present invention.

FIG. 6 schematically depicts an embodiment of the invention resembling that of FIG. 5, with the difference that the primary vaporization element 16 is directly fixed to the exhaust duct 14 at the upstream edge of the primary vaporization element 16 in closest proximity to the injection device 20. The primary vaporization element 16 is fixed to the exhaust duct 14 by an integrated bracket that may be welded to the exhaust duct 14 or bonded by any other means known in the art.

Figure 7A:
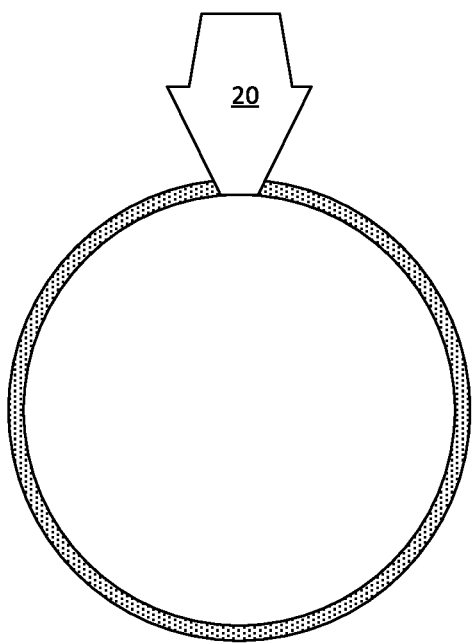
FIG. 7a schematically illustrates a primary vaporization element having a circular cross-sectional shape.
Figure 7B:
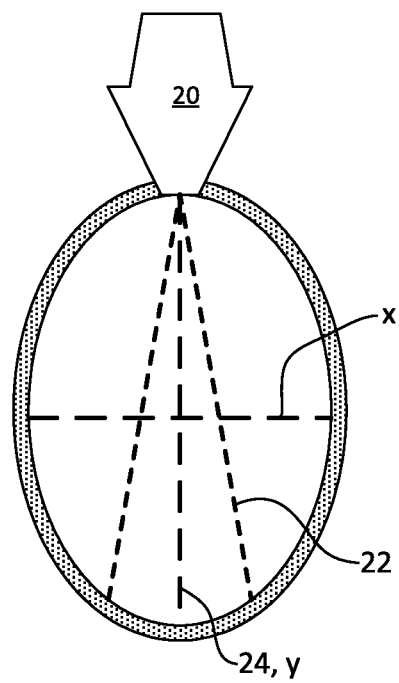
FIG. 7b schematically illustrates a primary vaporization element having an elliptical cross-sectional shape.
Figure 7C:
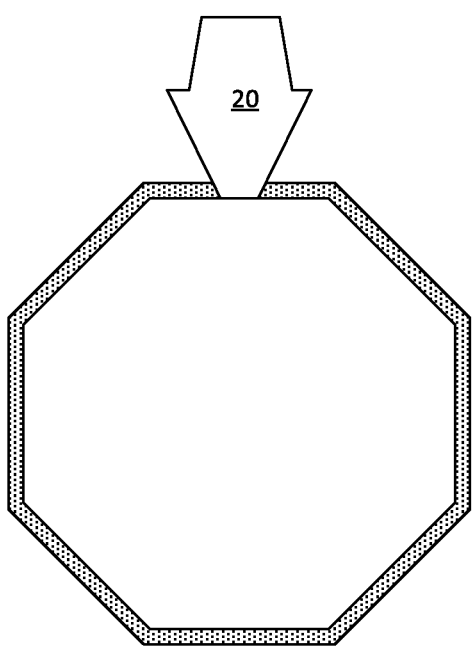
FIG. 7c schematically illustrates a primary vaporization element having an octagonal cross-sectional shape.
Figure 7D:
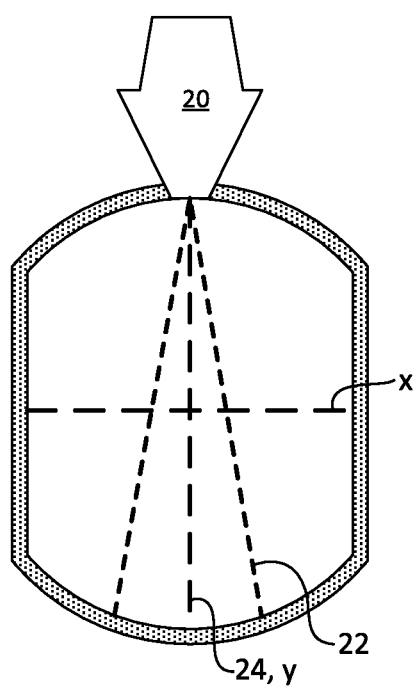
FIG. 7d schematically illustrates a primary vaporization element having a truncated circular cross-sectional shape.

FIGS. 7a-7d schematically illustrate a range of cross-sectional shapes that the primary vaporization element 16 potentially may have. The primary vaporization element 16 may be circular (FIG. 7a); elliptical (FIG. 7b); polygonal, such as octagonal (FIG. 7c); or may be a circle or ellipse wherein the sections formed by two parallel but diametrically opposed chords have been removed (FIG. 7d). Note that in FIGS. 7b and 7d, the dimensions x and y of the cross-section are not equal and that the dimension y that is congruous with the injection axis 24 of the injection unit is the largest.

The invention claimed is:

1. An exhaust additive distribution arrangement for an exhaust system of an internal combustion engine, the exhaust additive distribution arrangement comprising:
    an exhaust duct element, an exhaust additive injection unit, and a primary vaporization element configured for passage of an exhaust additive from the exhaust additive injection unit, through the exhaust duct element and past the primary vaporization element;
    the primary vaporization element comprises a tubular body arranged in an interior of the exhaust duct element, the primary vaporization element is shaped to define a predefined space between an inner surface of the exhaust duct element and an outer surface of the primary vaporization element, the primary vaporization element has an inlet end in the interior of the exhaust duct element and an outlet end that protrudes from the exhaust duct element at the outlet end of the primary vaporization element;
    the exhaust additive injection unit has an outlet arranged and located to inject exhaust additive liquid by spraying exhaust additive liquid from a point at the inner surface of the exhaust duct element to the inlet end of the primary vaporization element, into the primary vaporization element, and toward an inner surface of the primary vaporization element;
    the exhaust additive injection unit is of a liquid-only type; and
    the primary vaporization element has a length that is sufficiently short to allow injected exhaust additive liquid to run off the outlet end of the primary vaporization element when an exhaust flow rate is more than zero Kg/h and less than 1000 Kg/h, a temperature of the exhaust gas is more than 150° C. and less than 350° C., and dosage of the exhaust additive liquid is more than 5 and less than 30 g/min; and further comprising a second vaporization element arranged downstream of the primary vaporization element and wherein the secondary vaporization element is an insulated duct element.

2. An exhaust additive distribution arrangement according claim 1, wherein the primary vaporization element has a length such that the primary vaporization element extends a distance L of from 10 mm to 300 mm in a longitudinal direction beyond a point at which an injection axis of the exhaust additive injection unit passes into the inlet of the primary vaporization element and therein meets the inner surface of the primary vaporization element.

3. An exhaust additive distribution arrangement according to claim 1, wherein the outlet end of the primary vaporization element has a smaller cross sectional area than the inlet end of the primary vaporization element.

4. An exhaust additive distribution arrangement according to claim 1, wherein the tubular body of the primary vaporization element is comprised of non-foraminous metal.

5. An exhaust additive distribution arrangement according to claim 1, wherein the exhaust additive distribution arrangement does not comprise a mixing device.

6. An exhaust additive distribution arrangement according to claim 1, wherein a cross-section of the primary vaporization element in a plane perpendicular to a central lengthwise axis of the primary vaporization element has cross-sectional dimensions that are not equal and wherein the dimension that is congruous with the injection axis of the injection unit has the larger cross-sectional dimensions.

7. An exhaust additive distribution arrangement according to claim 1, wherein the primary vaporization element is fixedly attached to the exhaust duct element at a location closer to the inlet end of the primary vaporization element than the outlet end.

8. An exhaust additive distribution arrangement according to claim 1, further comprising struts between the exhaust duct element and the primary vaporization element for fixedly arranging the primary vaporization element in relation to the exhaust duct element.

9. An exhaust additive distribution arrangement according to claim 1, wherein the exhaust additive injection unit is arranged to form an acute angle θ between the injection axis and a central axis of the primary vaporization element from 10° to 80°.

10. An exhaust additive distribution system for an exhaust system of an internal combustion engine, the exhaust additive distribution system comprising:
    an exhaust additive distribution arrangement according to claim 1; and
    a decoupling element arranged at an outlet end of the exhaust duct element such that the outlet end of the primary vaporization element extends into an internal volume of the decoupling element defining a predefined space between an inner surface of the decoupling element and the outer surface of the primary vaporization element.

11. An exhaust additive distribution system according to claim 10, wherein the primary vaporization element extends at most 60% along a length of the decoupling element (18) in a longitudinal direction.

12. An exhaust additive distribution system according to claim 10, further comprising the secondary vaporization element is arranged at an outlet end of the decoupling element.

13. An exhaust additive distribution system according to claim 12, wherein the secondary vaporization element is an insulated duct element comprising a bend in the secondary vaporization element arranged to redirect a mean direction of the exhaust gas flow.

14. An exhaust additive distribution system according to claim 10, wherein the decoupling element comprises a bellows element or a strip-wound hose element.

15. A vehicle, comprising an exhaust additive distribution arrangement according to claim 1.

16. A vehicle, comprising an exhaust additive distribution arrangement according to claim 10.

17. An exhaust additive distribution system according to claim 1, wherein the primary vaporization element is directly fixed to the exhaust duct element at an upstream edge of the primary vaporization element.

* * * * *